US008345395B2

(12) United States Patent
Son (10) Patent No.: US 8,345,395 B2
(45) Date of Patent: Jan. 1, 2013

(54) ELECTROSTATIC DISCHARGE PROTECTION CIRCUIT HAVING A REDUCED SIZE AND ENHANCED DISCHARGE

(75) Inventor: Hee Jeong Son, Seoul (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

(21) Appl. No.: 13/102,292

(22) Filed: May 6, 2011

(65) Prior Publication Data

US 2011/0211291 A1 Sep. 1, 2011

Related U.S. Application Data

(62) Division of application No. 12/031,022, filed on Feb. 14, 2008, now abandoned.

(30) Foreign Application Priority Data

Feb. 15, 2007 (KR) .......................... 10-2007-0016262

(51) Int. Cl.
*H02H 9/00* (2006.01)
(52) U.S. Cl. .......................................... 361/56; 361/111
(58) Field of Classification Search .................... 361/56, 361/111
See application file for complete search history.

(56) References Cited

U.S. PATENT DOCUMENTS

| 5,744,842 | A | 4/1998 | Ker |
| 5,774,318 | A | 6/1998 | McClure et al. |
| 6,222,719 | B1* | 4/2001 | Kadah ........................... 361/247 |
| 6,288,850 | B1* | 9/2001 | Otomo .......................... 359/773 |
| 6,388,850 | B1 | 5/2002 | Ker et al. |
| 7,593,204 | B1* | 9/2009 | Iversen et al. ................... 361/56 |
| 7,859,807 | B2* | 12/2010 | Wang et al. ..................... 361/56 |
| 2002/0130390 | A1* | 9/2002 | Ker et al. ........................ 257/546 |
| 2006/0268474 | A1 | 11/2006 | Huang et al. |
| 2008/0123230 | A1* | 5/2008 | Yun ................................ 361/56 |

FOREIGN PATENT DOCUMENTS

| KR | 1998-066467 A | 10/1998 |
| KR | 100202682 B1 | 3/1999 |
| KR | 100639231 B1 | 10/2006 |
| KR | 100701708 B1 | 3/2007 |

OTHER PUBLICATIONS

USPTO OA mailed Oct. 19, 2010 in connection with U.S. Appl. No. 12/031,022.
USPTO FOA mailed Feb. 25, 2011 in connection with U.S. Appl. No. 12/031,022.

* cited by examiner

*Primary Examiner* — Rexford Barnie
*Assistant Examiner* — Tien Mai
(74) *Attorney, Agent, or Firm* — Ladas & Parry LLP (57) ABSTRACT

The present invention describes an electrostatic discharge protection circuit that protects an internal circuit of a semiconductor device from electrostatic discharge. The electrostatic discharge protection circuit includes a first electrostatic protection unit that transfers static electricity as a driving signal and also discharges the static electricity to a first discharge line when the static electricity is generated in a pad. It also includes a second electrostatic protection unit that discharges the static electricity generated in the pad to a second discharge line in response to the driving signal transferred from the first electrostatic protection unit. Since the first electrostatic protection unit performs an electrostatic discharge operation and at the same time aids the driving of the second electrostatic protection unit, electrostatic discharge performance can be enhanced while a layout area of the electrostatic discharge protection circuit can be reduced.

19 Claims, 8 Drawing Sheets

FIG. 1

(Prior Art)

ELECTROSTATIC DISCHARGE PROTECTION CIRCUIT HAVING A REDUCED SIZE AND ENHANCED DISCHARGE

CROSS-REFERENCE TO RELATED APPLICATIONS

The present application claims priority to Korean patent application number 10-2007-0016262 filed on Feb. 15, 2007, which is incorporated herein by reference in its entirety.

BACKGROUND OF THE INVENTION

The present invention relates generally to a semiconductor memory device, and more particularly to an electrostatic discharge protection circuit that protects an internal circuit of a semiconductor memory device from electrostatic discharge.

In general, when a semiconductor integrated circuit comes into contact with a charged human body or machine, an excessive current having a large amount of energy may cause extensive damage to an internal circuit of the semiconductor device. This excessive current is charged in the human body or the machine and is discharged to the internal circuit of the semiconductor device through an external pin and an input/output pad as static electricity. An external circuit may also be damaged as the static electricity charged in the internal circuit flows out through the machine due to the contact with the machine.

Accordingly, most semiconductor integrated circuits include an electrostatic discharge protection circuit between the input/output pad and the internal circuit to prevent damage to the main circuit.

The electrostatic discharge protection circuit may include various devices. A grounded-gate NMOS transistor is primarily used where an NMOS transistor is used as the electrostatic discharge protection circuit.

The input/output pad is coupled with a drain of the NMOS transistor. When a voltage level of the drain is increased due to static electricity, an avalanche breakdown is generated between the drain of the NMOS transistor and a substrate to allow electrostatic current to flow to the substrate.

When a voltage level of the substrate increases higher than a source voltage level of the NMOS transistor due to the electrostatic current that flows to the substrate, the electrostatic current is discharged from the drain to the source of the NMOS transistor according to the bipolar junction transistor (BJT) properties of the NMOS transistor.

However, the electrostatic discharge effect according to the BJT properties of the NMOS transistors not a superior method of discharge because of the driving ability limitations of the NMOS transistor. Therefore, a method of enhancing the driving ability of the NMOS transistor by applying bias to the gate of the NMOS transistor has been disclosed in the conventional art.

Figure 1:
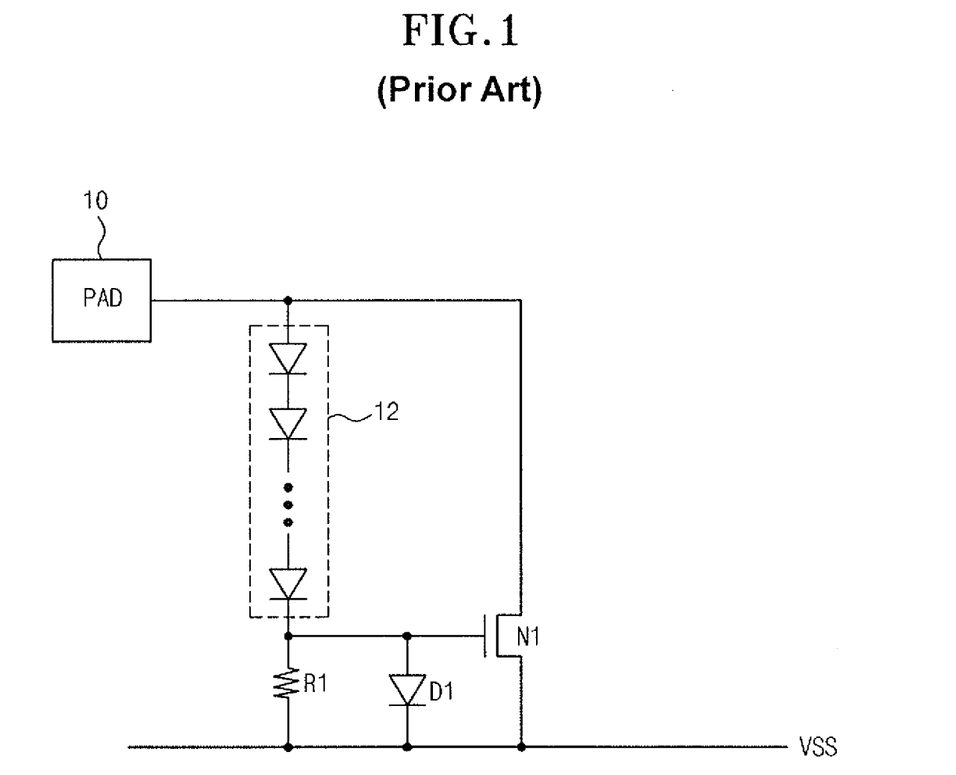
FIG. 1 is a circuit diagram illustrating a conventional electrostatic discharge protection circuit.

An example of a conventional method of enhancing the driving ability of the NMOS transistor is shown in FIG. 1. Shown in FIG. 1 is an electrostatic discharge protection circuit that drives an NMOS transistor N1 using a voltage drop by a diode chain 12 having a plurality of serially coupled diodes and a resistor R1.

When static electricity is generated at a pad 10, the static electricity is discharged from the pad 10 through the NMOS transistor N1 to a ground voltage line VSS according to the BJT properties of the NMOS transistor N1. The NMOS transistor N1 is turned on by the diode chain 12 and the resistor R1. Therefore, the driving ability of the NMOS transistor N1 is enhanced.

The conventional electrostatic discharge protection circuit may also include a diode D1 coupled between the gate of the NMOS transistor N1 and the ground voltage line VSS to form an additional path to transfer the static electricity generated in the pad 10 to the ground voltage line VSS.

However, since the conventional electrostatic discharge protection circuit in which the static electricity discharge path is formed between the pad 10 and the ground voltage line includes the diode chain 12, the resistor R1 and the diode D1 for enhancing the performance of electrostatic discharge, the layout area of the electrostatic discharge protection circuit is unwontedly increased.

In order to provide various electrostatic discharge paths, a general electrostatic discharge protection circuit also includes an electrostatic discharge protection device (not shown) coupled between the pad 10 and a power voltage line (not shown) and an electrostatic discharge protection device (not shown) coupled between the power voltage line and the ground voltage line VSS.

If the electrostatic discharge protection devices are also coupled to the conventional electrostatic discharge protection circuit, the layout area is problematically increased due to the existing diode chain 12, the resistor R1 and the diode D1 as well as the two added electrostatic discharge protection devices.

SUMMARY OF THE INVENTION

Accordingly, the present invention provides an electrostatic discharge protection circuit that has superior electrostatic discharge performance and, at the same time, has a reduced layout area.

The present invention also provides an electrostatic discharge protection circuit that has various discharge paths and enhanced electrostatic discharge performance and, at the same time, has a reduced layout area.

According to a first aspect of the present invention, there is provided an electrostatic discharge protection circuit, which includes: a first electrostatic protection unit which transfers static electricity as a driving signal and discharges the static electricity to a first discharge line when the static electricity is generated in a pad; and a second electrostatic protection unit which discharges the static electricity generated in the pad to a second discharge line in response to the driving signal transferred from the first electrostatic protection unit.

Preferably, the first discharge line is a power voltage line and the second discharge line is a ground voltage line.

Preferably, the first electrostatic protection unit includes an electrostatic transferring unit which transfers the static electricity as the driving signal in response to the static electricity generated in the pad; and an electrostatic discharge unit which discharges the static electricity corresponding to the driving signal to the first discharge line in response to the driving signal, wherein an output end of the electrostatic transferring unit is commonly coupled to the electrostatic discharge unit and the second electrostatic protection unit.

Preferably, the electrostatic transferring unit includes at least one diode coupled between the pad and the electrostatic discharge unit or a plurality of diodes serially coupled between the pad and the electrostatic discharge unit.

Preferably, the first electrostatic discharge unit includes at least one diode coupled between the electrostatic transferring unit and the first discharge line or a plurality diodes serially coupled between the electrostatic transferring unit and the first discharge line.

Preferably, the second electrostatic protection unit includes a MOS transistor which forms a current path between the pad and the second discharge line in response to the driving signal transferred from the first electrostatic protection unit.

Preferably, the second electrostatic protection unit additionally includes a resistor coupled between a gate of the MOS transistor and the second discharge line.

Preferably, a third electrostatic protection unit which performs either discharge of the static electricity transferred to the first discharge line to the second discharge line or discharge of the static electricity transferred to the second discharge line to the first discharge line is additionally coupled between the first discharge line and the second discharge line.

Preferably, the third electrostatic protection unit includes a MOS transistor that forms a current path between the first and second discharge lines in response to the static electricity transferred to either the first or second discharge line.

According to a second aspect of the present invention, there is provided an electrostatic discharge protection circuit, which includes: a first electrostatic protection unit which transfers static electricity as first and second driving signals and discharges the static electricity to a first discharge line when the static electricity is generated in a pad; a second electrostatic protection unit which discharges the static electricity generated in the pad to a second discharge line in response to the first driving signal; and a third electrostatic protection unit which performs either discharge of the static electricity transferred to the first discharge line to the second discharge line or discharge of the static electricity transferred to the second discharge line to the first discharge line.

Preferably, the first discharge line is a power voltage line and the second discharge line is a ground voltage line.

Preferably, the first electrostatic protection unit includes a first electrostatic transferring unit which transfers the static electricity as the first driving signal in response to the static electricity generated in the pad; a second electrostatic transferring unit which transfers the static electricity corresponding to the first driving signal as the second driving signal in response to first driving signal; and an electrostatic discharge unit which discharges the static electricity corresponding to the second driving signal to the first discharge line in response to the second driving signal, wherein an output end of the first electrostatic transferring unit is commonly coupled to the second electrostatic transferring unit and the second electrostatic protection unit and an output end of the second electrostatic transferring unit is commonly coupled to the electrostatic discharge unit and the third electrostatic protection unit.

Preferably, the first electrostatic transferring unit includes at least one diode coupled between the pad and the second electrostatic transferring unit or a plurality of diodes serially coupled between the pad and the second electrostatic transferring unit.

Alternatively, the first electrostatic transferring unit includes at least one MOS transistor coupled between the pad and the second electrostatic transferring unit or a plurality of MOS transistors serially coupled between the pad and the second electrostatic transferring unit, and a gate of the MOS transistor is coupled to the first discharge line.

Preferably, the second electrostatic transferring unit includes at least one diode coupled between the first electrostatic transferring unit and the electrostatic discharge unit or a plurality of diodes serially coupled between the first electrostatic transferring unit and the electrostatic discharge unit.

Alternatively, the second electrostatic transferring unit includes at least one MOS transistor coupled between the first electrostatic transferring unit and the electrostatic discharge unit or a plurality of MOS transistors serially coupled between the first electrostatic transferring unit and the electrostatic discharge unit, and a gate of the MOS transistor is coupled to the first discharge line.

Preferably, the electrostatic discharge unit includes at least one diode coupled between the second electrostatic transferring unit and the first discharge line or a plurality of diodes serially coupled between the second electrostatic transferring unit and the first discharge line.

Alternatively, the electrostatic discharge unit includes at least one MOS transistor coupled between the second electrostatic transferring unit and the first discharge line or a plurality of MOS transistors serially coupled between the second electrostatic transferring unit and the first discharge line, and gates of the plurality of the MOS transistors are commonly coupled to the first discharge line.

Preferably, the first electrostatic protection unit additionally includes a resistor coupled between the first discharge line and the first electrostatic transferring unit.

Preferably, the second electrostatic protection unit includes a MOS transistor which forms a current path between the pad and the second discharge line in response to the first driving signal.

Preferably, the second electrostatic protection unit additionally includes a resistor coupled between a gate of the MOS transistor and the second discharge line.

Preferably, the third electrostatic protection unit includes a MOS transistor that forms a current path between the first discharge line and the second discharge line in response to the second driving signal.

Preferably, the third electrostatic protection unit additionally includes a resistor coupled between a gate of the MOS transistor and the second discharge line.

DESCRIPTION OF SPECIFIC EMBODIMENTS

Hereinafter, preferred embodiments of the present invention will be described in detail with reference to the accompanying drawings.

An electrostatic discharge protection circuit of the present invention is comprised of a plurality of electrostatic protection units that discharge static electricity generated in a pad and an electrostatic protection unit coupled between the pad and a predetermined voltage line acting to discharge static electricity as well as aid the driving of the other electrostatic protection units. It is therefore possible to enhance electrostatic discharge performance and also reduce an occupation area of the electrostatic discharge protection circuit.

Figure 2:
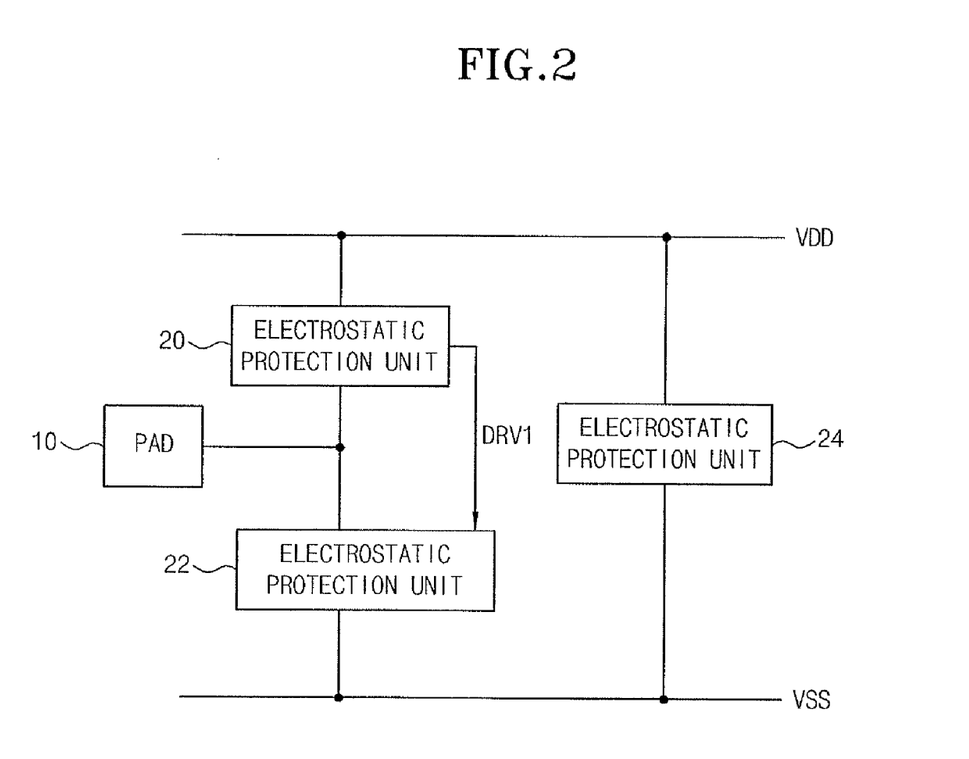
FIG. 2 is a block diagram showing an electrostatic discharge protection circuit according to an embodiment of the present invention.

Specifically, the electrostatic discharge protection circuit of the present invention is shown in FIG. 2. Referring to FIG. 2, the electrostatic discharge protection circuit of the present invention includes an electrostatic protection unit 20 coupled between a pad 10 and a power voltage line VDD and an electrostatic protection unit 22 coupled between the pad 10 and a ground voltage line VSS. The electrostatic discharge protection circuit in an embodiment of the present invention may additionally include an electrostatic protection unit 24 coupled between the power voltage line VDD and the ground voltage line VSS.

The electrostatic protection unit 20 transfers static electricity as a driving signal DRV1 and, at the same time, discharges static electricity to the power voltage line VDD when static electricity is generated.

The electrostatic protection unit 22 then discharges the static electricity generated in the pad 10 in response to the driving signal DRV1.

The electrostatic protection unit 24 also discharges from the power voltage line VDD or the ground voltage line VSS to the ground voltage line VSS or the power voltage line VDD respectively.

Figure 3:
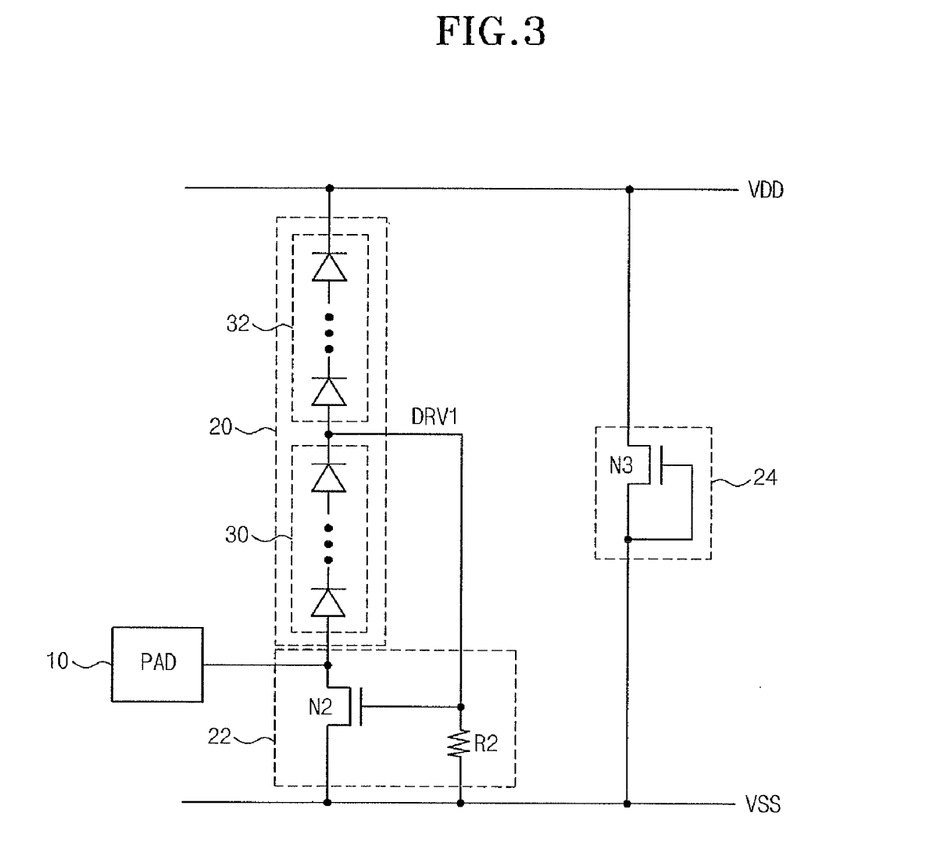
FIG. 3 is a circuit diagram illustrating a detailed structure of FIG. 2.

The electrostatic protection units 20, 22 and 24 in FIG. 2 may be embodied as a circuit as shown in FIG. 3.

Referring to FIG. 3, the electrostatic protection unit 20 includes an electrostatic transferring unit 30 that transfers the driving signal DRV1 in response to the static electricity generated in the pad 10 and an electrostatic discharge unit 32 that discharges the static electricity to the power voltage line VDD in response to the driving signal DRV1.

Herein, the electrostatic transferring unit 30 may include at least one diode coupled between the pad 10 and the electrostatic discharge unit 32 or a plurality of diodes serially coupled between the pad 10 and the electrostatic discharge unit 32. A cathode of the diode is coupled to the electrostatic discharge unit 32 and an anode of the diode is coupled to the pad 10.

The electrostatic discharge unit 32 may also include at least one diode coupled between the electrostatic transferring unit 30 and the power voltage line VDD or a plurality of diodes serially coupled between the electrostatic transferring unit 30 and the power voltage line VDD. A cathode of the diode is coupled to the power voltage line VDD and an anode of the diode is coupled to the electrostatic discharge unit 32.

The electrostatic protection unit 22 includes an NMOS transistor N2 that forms a current path between the pad 10 and the ground voltage line VSS in response to the driving signal DRV1 and may additionally include a resistor R2 coupled between a gate of the NMOS transistor N2 and the ground voltage line VSS so the NMOS transistor N2 can be driven faster.

The gate of the NMOS transistor N2 is coupled between the electrostatic transferring unit 30 and the electrostatic discharge unit 32. A drain (or a source) of the NMOS transistor N2 is coupled to the pad 10 and a source (or a drain) of the NMOS transistor N2 is coupled to the ground voltage line VSS.

The electrostatic protection unit 24 includes an NMOS transistor N3 that is turned on as the static electricity is transferred to the power voltage line VDD or the ground voltage line VSS. The electrostatic protection unit 24 forms a current path between the power voltage line VDD and the ground voltage line VSS.

A gate and a source (or a drain) of the NMOS transistor N3 are commonly coupled to the ground voltage line VSS and a drain (or a source) of the NMOS transistor N3 is coupled to power voltage line VDD.

The electrostatic discharge protection circuit of the present invention, as shown in FIG. 3, discharges static electricity generated in the pad 10 to the power voltage line VDD or the ground voltage line VSS through the electrostatic protection units 20, 22 and 24, discharges static electricity generated in the power voltage line VDD or the ground voltage line VSS to the pad 10, and discharges static electricity generated in the power voltage line VDD or the ground voltage line VSS to the ground voltage line VSS or the power voltage line VDD respectively.

The electrostatic discharge protection circuit of the present invention discharges the static electricity generated in the pad 10 to the power voltage line VDD. Positive static electricity generated in the pad 10 is discharged to the power voltage line VDD through the electrostatic transferring unit 30 and the electrostatic discharge unit 32.

The static electricity is outputted as the driving signal DRV1 through the electrostatic transferring unit 30. As the driving signal DRV1 is transferred to the resistor R2, a voltage drop by the diode of the electrostatic transferring unit 30 and the resistor R2 turns on the NMOS transistor N2. As the NMOS transistor N2 is turned on, the static electricity generated in the pad 10 is transferred to the ground voltage line VSS. The NMOS transistor N3 is then turned on by the static electricity transferred to the ground voltage line VSS. The static electricity in the ground voltage line VSS is then discharged to the power voltage line VDD.

Next, when describing the operation of discharging the positive static electricity generated in the pad 10 to the ground voltage line VSS, the positive static electricity generated in the pad 10 passes through the electrostatic protection unit 20, the power voltage line VDD, and the electrostatic protection unit 24 and subsequently discharged to the ground voltage line VSS.

The static electricity is outputted as the driving signal DRV1 through the electrostatic transferring unit 30. A voltage drop occurs across the resistor R2 by the driving signal DRV1 and the static electricity discharged to the ground voltage line VSS through the electrostatic protection unit 24. The NMOS transistor N2 is then turned on by the voltage drop. Therefore, the static electricity is discharged to the ground voltage line VSS through the turned on NMOS transistor N2.

In the operation of discharging positive static electricity generated in the ground voltage line VSS to the pad 10, the NMOS transistor N2 is turned on by the positive static electricity generated in the ground voltage line VSS. The static electricity is therefore directly discharged from the ground voltage line VSS to the pad 10.

Finally, in the operation of discharging positive static electricity generated in the ground voltage line VDD to the pad 10, the NMOS transistor N3 is turned on by the positive static electricity generated in the power voltage line VDD. The static electricity is thereby transferred from the power voltage line VDD to the ground voltage line VSS. The NMOS transistor N2 is then turned on by the static electricity transferred to the ground voltage line VSS and the static electricity is discharged from the ground voltage line VSS to the pad 10.

Figure 4:
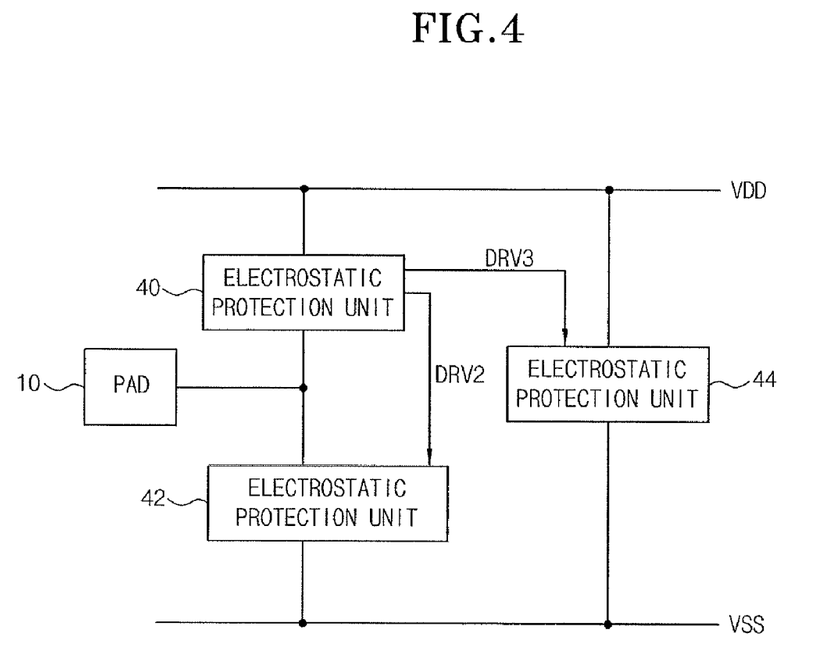
FIG. 4 is a block diagram showing an electrostatic discharge protection circuit according to another embodiment of the present invention.

As described above, in the electrostatic discharge protection circuit according to an embodiment of the present invention, since the electrostatic protection unit 20 coupled between the pad 10 and the power voltage line VDD acts to discharge the static electricity as well as enhancing the driving ability of the electrostatic protection unit 22 coupled between the pad 10 and the ground voltage line VSS, area use of a semiconductor chip is reduced while enhancing the electrostatic discharge efficiency. As shown in FIG. 4, an electrostatic discharge protection circuit according to an embodiment of the present invention includes an electrostatic protection unit 40 coupled between a pad 10 and a power voltage line VDD, an electrostatic protection unit 42 coupled between the pad 10 and a ground voltage line VSS, and an electrostatic protection unit 44 coupled between the power voltage line VDD and a ground voltage line VSS.

The electrostatic protection unit 40 transfers static electricity as driving signals DRV2 and DRV3 while discharging the static electricity to the power voltage line VDD when static electricity is generated in the pad 10.

The electrostatic protection unit 42 also discharges the static electricity generated in the pad 10 to the ground voltage line VSS in response to the driving signal DRV2.

The electrostatic protection unit 44 discharges the static electricity transferred to the power voltage line VDD or the ground voltage line VSS to the ground voltage line VSS or the power voltage line VDD respectively, in response to the driving signal DRV3.

The electrostatic discharge protection circuit in FIG. 4 can be embodied as circuits, examples of which are shown in FIGS. 5 to 8.

Figure 5:
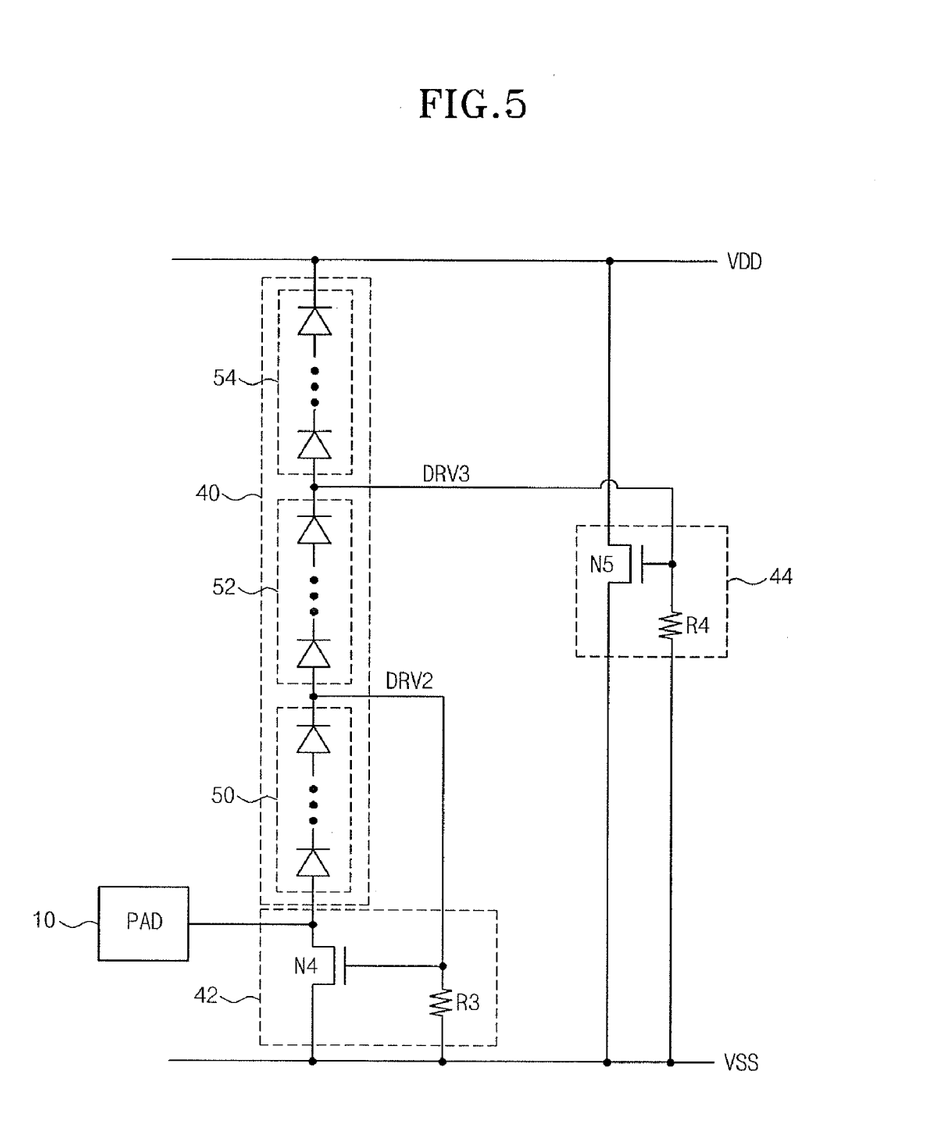
FIG. 5 is a circuit diagram illustrating a first example of a detailed structure of FIG. 4.

Referring to FIG. 5, the electrostatic protection unit 40 includes an electrostatic transferring unit 50 that transfers the static electricity as the driving signal DRV2 in response to the static electricity generated in the pad 10. The electrostatic protection unit 40 also includes an electrostatic transferring unit 52 that transfers the static electricity corresponding to the driving signal DRV2, as the driving signal DRV3 in response to the driving signal DRV2. Finally, the electrostatic protection unit 40 includes an electrostatic discharge unit 54 that discharges the static electricity corresponding to the driving signal DRV3 to the power voltage line VDD in response to the driving signal DRV3.

The electrostatic transferring unit 50 may include at least one diode coupled between the pad 10 and the electrostatic discharge unit 52 or a plurality of diodes serially coupled between the pad 10 and the electrostatic discharge unit 52. A cathode of the diode is coupled to the electrostatic discharge unit 52 and an anode of the diode is coupled to the pad 10.

The electrostatic transferring unit 52 may include at least one diode coupled between the electrostatic transferring unit 50 and the electrostatic discharge unit 54 or a plurality of diodes serially coupled between the electrostatic transferring unit 50 and the electrostatic discharge unit 54. A cathode of the diode is coupled to the electrostatic discharge unit 54 and an anode of the diode is coupled to the electrostatic discharge unit 52.

The electrostatic discharge unit 54 may include at least one diode coupled between the electrostatic transferring unit 52 and the power voltage line VDD or a plurality of diodes serially coupled between the electrostatic transferring unit 52 and the power voltage line VDD. A cathode of the diode is coupled to the power voltage line VDD and an anode of the diode is coupled to the electrostatic discharge unit 52.

The electrostatic protection unit 42 includes an NMOS transistor N4 that forms a current path between the pad 10 and the ground voltage line VSS in response to the driving signal DRV2. The electrostatic protection unit 42 may additionally include a resistor R3 coupled between a gate of the NMOS transistor N4 and the ground voltage line VSS so that the NMOS transistor N4 can be driven faster.

The gate of the NMOS transistor N4 is coupled between the electrostatic transferring unit 50 and the electrostatic transferring unit 52, a drain (or a source) of the NMOS transistor N4 is coupled with the pad 10 and a source (or a drain) of the NMOS transistor N4 is coupled with the ground voltage line VSS.

The electrostatic protection unit 44 includes an NMOS transistor N5 that forms a current path between the power voltage line VDD and the ground voltage line VSS in response to the driving signal DRV3. The electrostatic protection unit 44 may additionally include a resistor R4 coupled between a gate of the NMOS transistor N5 and the ground voltage line VSS so that the NMOS transistor N5 can be driven faster.

A gate and a source (or a drain) of the NMOS transistor N5 are commonly coupled to the ground voltage line VSS and a drain (or a source) of the NMOS transistor N5 is coupled to power voltage line VDD.

In the electrostatic discharge protection circuit as shown in FIG. 5, since the NMOS transistor N5 can be turned on more quickly by the driving signal DRV3 transferred from the electrostatic transferring unit 52, the electrostatic discharge protection performance is enhanced by the operation of electrostatic protection unit 44.

Figure 6:
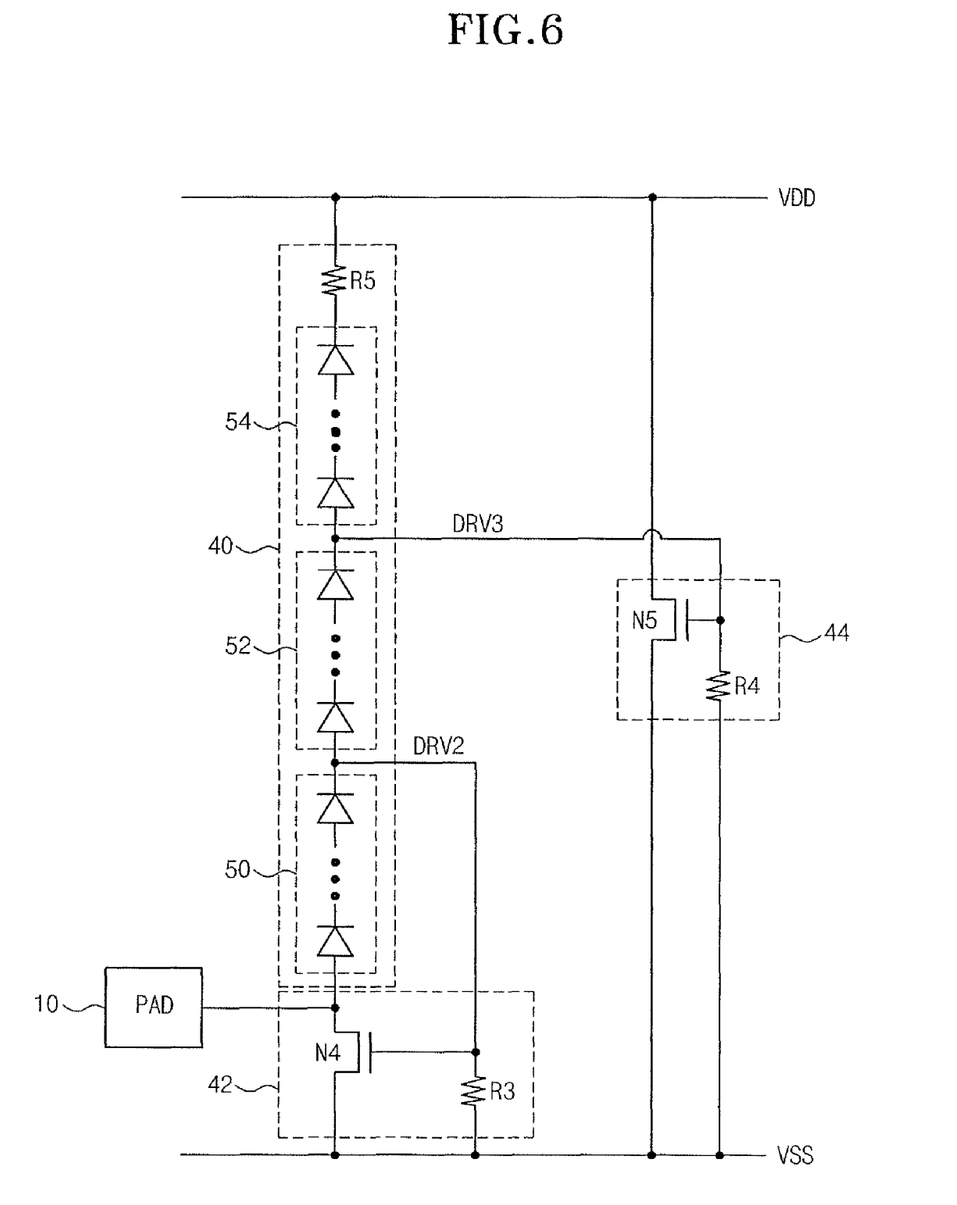
FIG. 6 is a circuit diagram illustrating a second example of a detailed structure of FIG. 4.

In the structure in FIG. 6, a resistor R5 may be additionally coupled between the electrostatic discharging unit 54 and the power voltage line VDD. If the resistor R5 is coupled between the electrostatic discharging unit 54 and the power voltage line VDD as shown in FIG. 6, the amount of current that flows to the diodes comprising the electrostatic transferring units 50 and 52 and the electrostatic discharge unit 54 is reduced while an amount of current that is discharged in the direction of the NMOS transistor N4 is increased.

Therefore, since the electrostatic discharging performance is not largely decreased although sizes of the diode comprising the electrostatic transferring units 50 and 52 and the electrostatic discharge unit 54 are reduced, the sizes of the diodes are reduced thereby reducing the area of the electrostatic discharging protection circuit.

Figure 7:
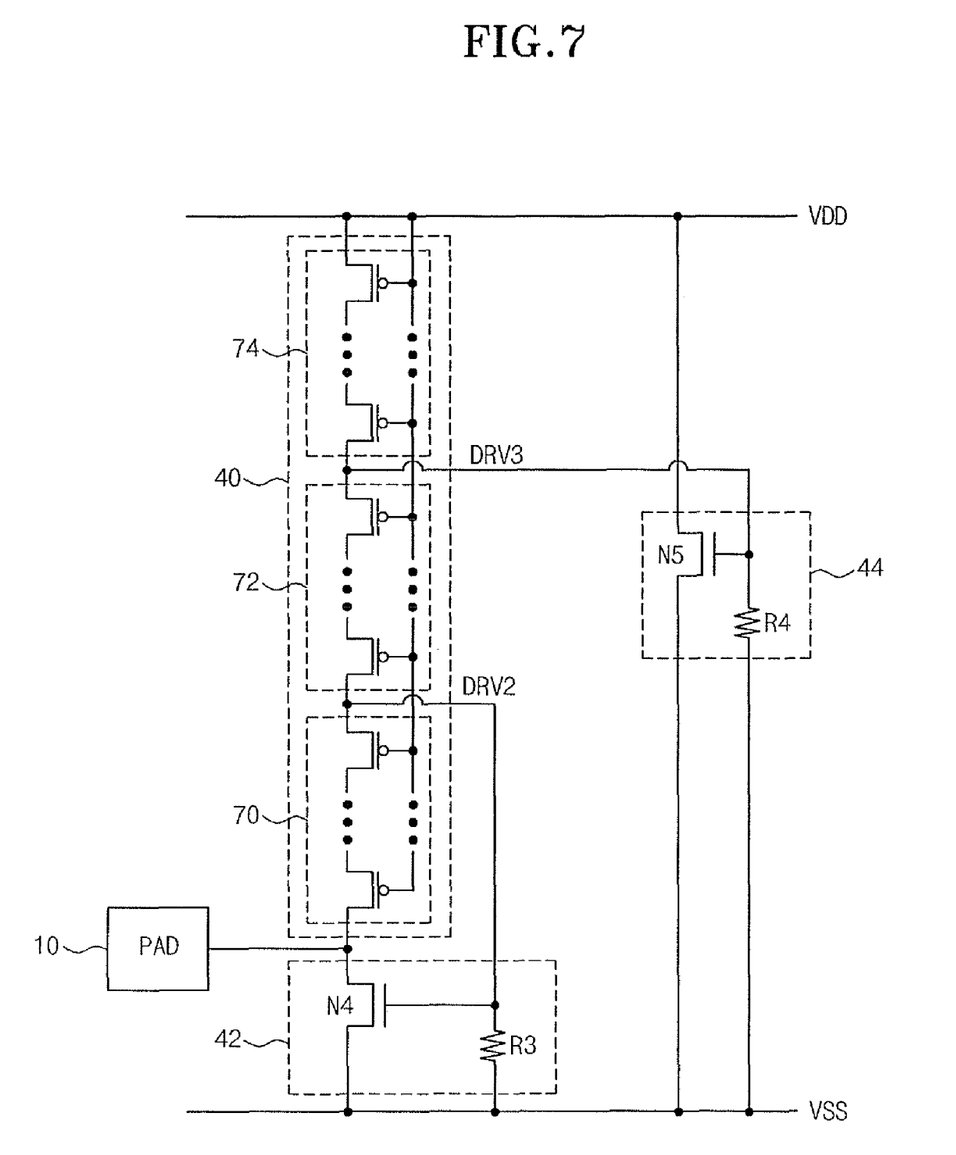
FIG. 7 is a circuit diagram illustrating a third example of a detailed structure of FIG. 4.

Referring to FIG. 7, the electrostatic discharging protection unit 40 may include electrostatic transferring units 70 and 72 and an electrostatic discharge unit 74, each of which including one or a plurality of PMOS transistors instead of the diode.

In other words, the electrostatic transferring unit 70 may include at least one PMOS transistor coupled between the pad 10 and the electrostatic transferring unit 72 or a plurality of PMOS transistors coupled between the pad 10 and the electrostatic transferring unit 72. Accordingly, a gate of the PMOS transistor is coupled to the power voltage line VDD.

The electrostatic transferring unit 72 may include at least one PMOS transistor coupled between the electrostatic transferring unit 70 and the electrostatic discharge unit 74 or a plurality of PMOS transistors coupled between the electrostatic transferring unit 70 and the electrostatic discharge unit 74. Accordingly, a gate of the PMOS transistor is coupled to the power voltage line VDD.

The electrostatic discharge unit 74 may include at least one PMOS transistor coupled between the electrostatic transferring unit 72 and the power voltage line VDD or a plurality of PMOS transistors coupled between the electrostatic transferring unit 72 and the power voltage line VDD. Accordingly, a gate of the PMOS transistor is coupled to the power voltage line VDD.

Figure 8:
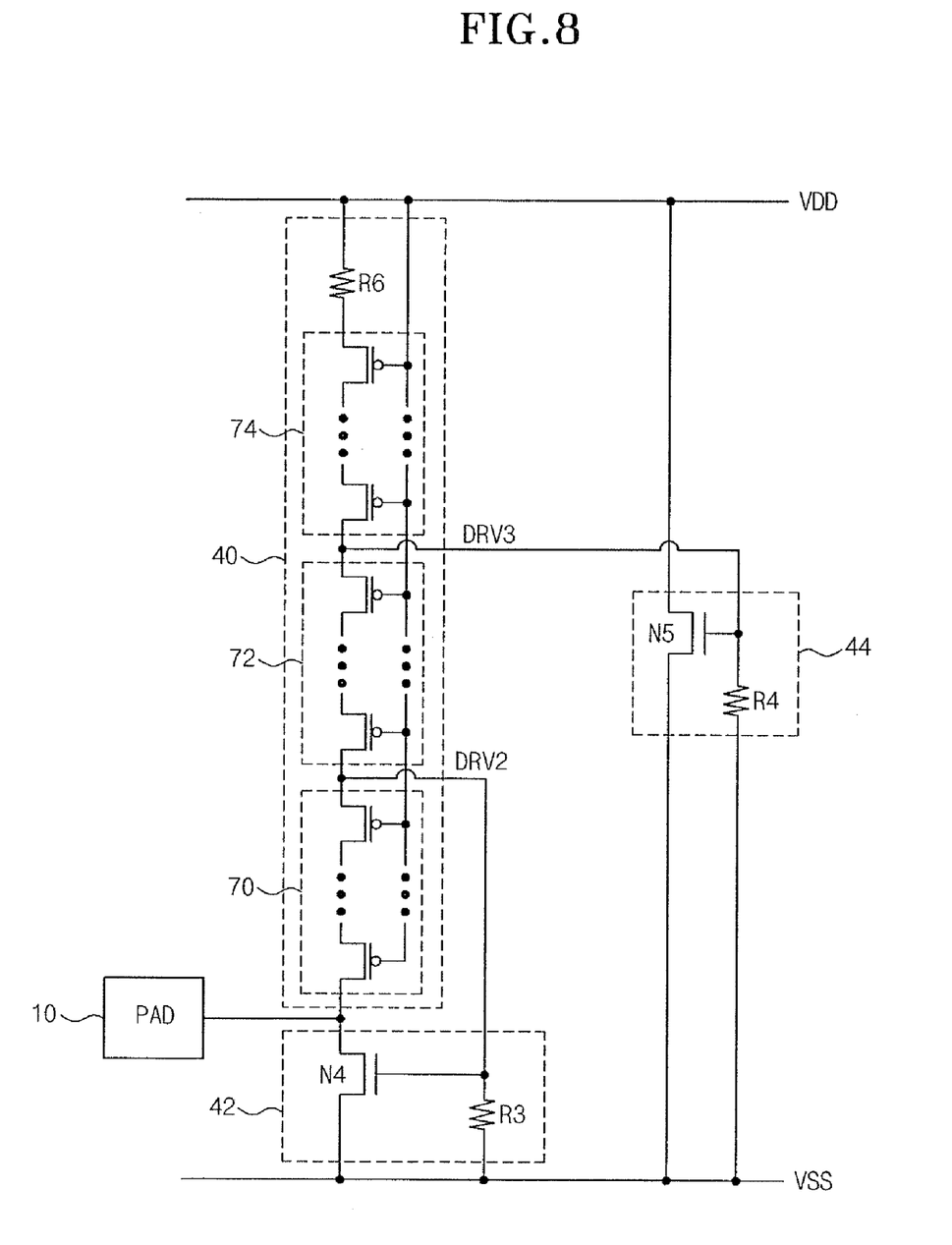
FIG. 8 is a circuit diagram illustrating a fourth example of a detailed structure of FIG. 4.

As shown in FIG. 8, the structure of FIG. 7 may additionally include a resistor R6 coupled between the electrostatic discharging unit 74 and the power voltage line VDD.

As is apparent from the above description, the electrostatic discharge protection circuit of the present has superior electrostatic discharge performance while at the same time reducing a layout area of the electrostatic discharge protection circuit since the electrostatic discharge protection device performs an electrostatic discharge operation while at the same time aiding the driving of other electrostatic discharge protection devices.

Also, the electrostatic discharge protection circuit of the present invention provides various discharge paths while at the same time enhancing the electrostatic discharge performance of the electrostatic discharge protection devices in respective paths since the electrostatic discharge protection devices are coupled between the pad and the voltage lines respectively and some of the electrostatic discharge protection devices act to aid the driving of the other electrostatic discharge protection devices.

Finally, in the present invention, various discharge paths are provided and electrostatic discharge performance is enhanced while at the same time reducing a layout area of the electrostatic discharge protection circuit since the electrostatic discharge protection devices including an electrostatic discharge device that discharges static electricity and aids the driving of the other electrostatic discharge protection device are disposed in various paths.

Those skilled in the art will appreciate that the specific embodiments disclosed in the foregoing description may be readily utilized as a basis for modifying or designing other embodiments for carrying out the same purposes of the present invention. Those skilled in the art will also appreciate that such equivalent embodiments do not deviate from the spirit and scope of the invention as set forth in the appended claims.

What is claimed is:

1. An electrostatic discharge protection circuit, comprising:
    a first electrostatic protection unit which transfers static electricity as a first and a second driving signal and discharges the static electricity to a first discharge line when the static electricity is generated in a pad;
    a second electrostatic protection unit which discharges the static electricity generated in the pad to a second discharge line in response to the first driving signal; and
    a third electrostatic protection unit which performs either discharge of the static electricity transferred to the first discharge line to the second discharge line or discharge of the static electricity transferred to the second discharge line to the first discharge line,
    wherein the first electrostatic protection unit comprises:
    a first electrostatic transferring unit which transfers the static electricity as the first driving signal in response to the static electricity generated in the pad;
    a second electrostatic transferring unit which transfers the static electricity corresponding to the first driving signal as the second driving signal in response to first driving signal; and
    an electrostatic discharge unit which discharges the static electricity corresponding to the second driving signal to the first discharge line in response to the second driving signal,
    wherein an output end of the first electrostatic transferring unit is commonly coupled to the second electrostatic transferring unit and the second electrostatic protection unit and an output end of the second electrostatic transferring unit is commonly coupled to the electrostatic discharge unit and the third electrostatic protection unit.

2. The electrostatic discharge protection circuit as set forth in claim 1, wherein the first discharge line is a power voltage line and the second discharge line is a ground voltage line.

3. The electrostatic discharge protection circuit as set forth in claim 1, wherein the first electrostatic transferring unit includes at least one diode coupled between the pad and the second electrostatic transferring unit.

4. The electrostatic discharge protection circuit as set forth in claim 1, wherein the first electrostatic transferring unit includes a plurality of diodes serially coupled between the pad and the second electrostatic transferring unit.

5. The electrostatic discharge protection circuit as set forth in claim 1, wherein the first electrostatic transferring unit includes at least one MOS transistor coupled between the pad and the second electrostatic transferring unit, and a gate of the MOS transistor is coupled to the first discharge line.

6. The electrostatic discharge protection circuit as set forth in claim 1, wherein the first electrostatic transferring unit includes a plurality of MOS transistors serially coupled between the pad and the second electrostatic transferring unit, and each gate of the plurality of MOS transistors is commonly coupled to the first discharge line.

7. The electrostatic discharge protection circuit as set forth in claim 1, wherein the second electrostatic transferring unit includes at least one diode coupled between the first electrostatic transferring unit and the electrostatic discharge unit.

8. The electrostatic discharge protection circuit as set forth in claim 1, wherein the second electrostatic transferring unit includes a plurality of diodes serially coupled between the first electrostatic transferring unit and the electrostatic discharge unit.

9. The electrostatic discharge protection circuit as set forth in claim 1, wherein the second electrostatic transferring unit includes at least one MOS transistor coupled between the first electrostatic transferring unit and the electrostatic discharge unit, and a gate of the MOS transistor is coupled to the first discharge line.

10. The electrostatic discharge protection circuit as set forth in claim 1, wherein the second electrostatic transferring unit includes a plurality of MOS transistors serially coupled between the first electrostatic transferring unit and the electrostatic discharge unit, and each gate of the plurality of MOS transistors is commonly coupled to the first discharge line.

11. The electrostatic discharge protection circuit as set forth in claim 1, wherein the electrostatic discharge unit includes at least one diode coupled between the second electrostatic transferring unit and the first discharge line.

12. The electrostatic discharge protection circuit as set forth in claim 1, wherein the electrostatic discharge unit includes a plurality of diodes serially coupled between the second electrostatic transferring unit and the first discharge line.

13. The electrostatic discharge protection circuit as set forth in claim 1, wherein the electrostatic discharge unit includes at least one MOS transistor coupled between the second electrostatic transferring and the first discharge line, and a gate of the MOS transistor is coupled to the first discharge line.

14. The electrostatic discharge protection circuit as set forth in claim 3, wherein the electrostatic discharge unit includes a plurality of MOS transistors serially coupled between the second electrostatic transferring unit and the first discharge line, and each gate of the plurality of the MOS transistors is commonly coupled to the first discharge line.

15. The electrostatic discharge protection circuit as set forth in claim 1, wherein the first electrostatic protection unit additionally includes a resistor coupled between the first discharge line and the first electrostatic transferring unit.

16. The electrostatic discharge protection circuit as set forth in claim 1, wherein the second electrostatic protection unit includes a MOS transistor which forms a current path between the pad and the second discharge line in response to the first driving signal.

17. The electrostatic discharge protection circuit as set forth in claim 16, wherein the second electrostatic protection unit additionally includes a resistor coupled between a gate of the MOS transistor and the second discharge line.

18. The electrostatic discharge protection circuit as set forth in claim 1, wherein the third electrostatic protection unit includes a MOS transistor which forms a current path between the first discharge line and the second discharge line in response to the second driving signal.

19. The electrostatic discharge protection circuit as set forth in claim 18, wherein the third electrostatic protection unit additionally includes a resistor coupled between a gate of the MOS transistor and the second discharge line.

\* \* \* \* \*